United States Patent [19]

Rafner

[11] Patent Number: 4,972,396
[45] Date of Patent: Nov. 20, 1990

[54] MULTIPLE INDEPENDENTLY POSITIONABLE RECORDING-READING HEAD DISK SYSTEM

[75] Inventor: David J. Rafner, Golden Valley, Minn.

[73] Assignee: Honeywell Inc., Minneapolis, Minn.

[21] Appl. No.: 261,678

[22] Filed: Oct. 24, 1988

[51] Int. Cl.$^5$ ............................................. G11B 7/00
[52] U.S. Cl. ........................................ 369/32; 369/33; 369/34; 369/36; 369/38; 369/178; 369/44.37; 360/18; 360/114
[58] Field of Search ............ 360/22, 18, 98.01, 98.02, 360/114, 75, 77.02, 77.03; 369/32, 34, 43–47, 36, 35, 37, 38, 178, 13, 14, 44.37; 358/342

[56] References Cited

U.S. PATENT DOCUMENTS

| | | | |
|---|---|---|---|
| 3,728,699 | 4/1975 | Sordello | 360/75 |
| 4,371,902 | 2/1983 | Baxter et al. | 360/75 |
| 4,387,452 | 6/1983 | Bricot et al. | 369/32 |
| 4,422,112 | 12/1983 | Tanaka | 360/77.12 |
| 4,577,240 | 3/1986 | Hedberg et al. | 360/22 |
| 4,644,515 | 2/1987 | Allebest et al. | 369/32 |
| 4,694,358 | 9/1987 | Muchnik et al. | 369/14 X |
| 4,731,685 | 3/1988 | Orcutt | 360/106 |
| 4,871,903 | 10/1989 | Carrell | 369/44 X |

OTHER PUBLICATIONS

"Optical Memories vie for Data Storage", by Jeff Hecht, High Technology, Aug. 1987.

Primary Examiner—Robert L. Richardson
Attorney, Agent, or Firm—Haugen and Nikolai

[57] ABSTRACT

A multiple independently positionable recording-reading head optical disk system. The system includes at least one optical disk having an arrangement of data elements. A plurality of recording-reading heads read and write data onto the optical disk. An apparatus for transporting the plurality of recording-reading heads over one side of the optical disk enabling each of the recording-reading heads to read data from or write data onto the optical disk independently of the other recording-reading heads.

18 Claims, 3 Drawing Sheets

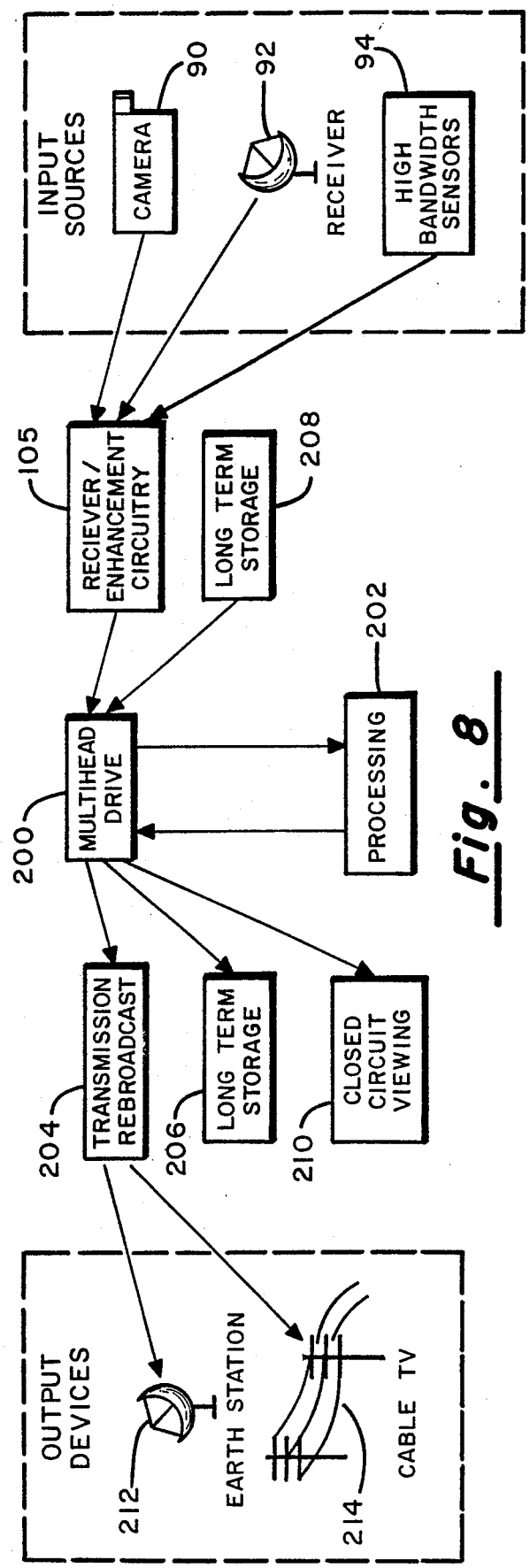
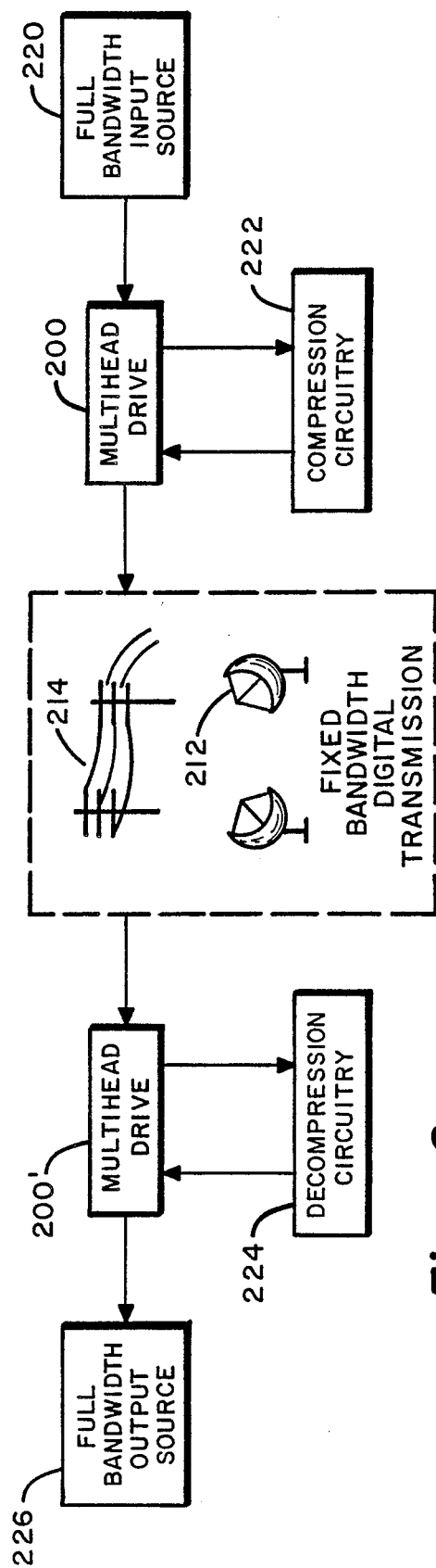

MULTIPLE INDEPENDENTLY POSITIONABLE RECORDING-READING HEAD DISK SYSTEM

BACKGROUND OF THE INVENTION

I. Field of the Invention:

The present invention relates generally to digital disk storage systems and more particularly to a multiple independently positionable recording-reading head optical or magnetic disk system.

II. Discussion of the Prior Art:

FIG. 1 shows schematically a typical known single head optical disk positioning system. Such a system includes a transducing head 10 which may use focusing means 12 such as a laser, prism or lens. The head 10 is transported across an optical disk 40 typically using a wormscrew drive or belt drive 50 associated with a stepper motor 30. Because there is only one transducing head on such systems, there is no ability to edit, review or output sensor acquired data while simultaneously accepting an input data stream, for example.

While some known devices use multiple transducer heads to access data storage disks, none of the known devices offer the ability of these heads to move and act independently of each other and either read or write data which was read or written by one of the other heads on the same side of such disks. U.S. Pat. No. 4,644,515 to Allebest et al. discloses one example of such a device. Allebest et al. utilizes a substrate-based array of heads such that a disk with 54,000 tracks has 54,000 read heads. It offers and discusses only read access. The device disclosed in Allebest features heads that are not mobile and thus cannot be used with the continuous track recording method wherein the tracks are actually a single track spiraling inward and the radial position of the track varies constantly. The Allebest et al. device cannot achieve truly continuous access to new data since a single track cannot be read by two heads simultaneously. Allebest et al. also faces difficulties in overcoming the technical hurdles required to be overcome for implementing a 54,000 head read mechanism and system support represents an order of magnitude increase in prototyping and low volume production costs. Allebest et al. does not even address write capabilities for such a fixed array system.

FIGS. 4 and 5 are schematic views of prior art disk systems employing single recording-reading heads. As shown in FIG. 4, recording reading head 60 is typically a magnetic transducer mounted on sweep arm 62. The recording-reading head then sweeps across the disk 64, which is typically a magnetic media type disk, through the control of a mechanical control means 66. Mechanical control means 66 is well known in the art and may be, for example, a separate motor or servo motor.

FIG. 5 illustrates schematically another well known transport mechanism for a single-head system. The head 60 is transported by cantilever arm 70 in a radial path traversing the disk tracks. The cantilever arm 70 is typically controlled by a motor 67, such as a stepper motor or equivalent device. As in the optical disk device of FIG. 1, since there is only one transducing head on the system shown in FIGS. 4 and 5, there is no ability to edit, review, or output data from one area of the disk while simultaneously performing other equivalent tasks to information on other areas of the disk media.

In contrast, the present invention discloses a multihead and drive mechanism system implemented in a technically feasible configuration of existing recording-reading heads and servo hardware.

An excellent application of a high capacity multiple independently positionable read/write head drive would be on almost any advanced autonomous, semi-autonomous or information gathering remote vehicle or platform. Obvious examples include recognizance and deep space satellites or probes and autonomous battlefield robotics. In these very demanding applications, the flexibility of the invention to simultaneously read, write and alter several high bandwidth streams of data simultaneously would be invaluable.

Such applications typically have a high level of imbedded signal processing and analysis capability related to a limitation of transmission capabilities back to their control center. A remotely or autonomously guided surveillance aircraft for example, might acquire high resolution, multispectral sensor and video information but only have the transmission capability equal to a low resolution video signal. If such a vehicle were equipped with the invention discussed herein, no significant data need be lost as this device would allow a heretofore unavailable length of time to analyze, compress, enhance, prioritize or rebroadcast the data.

In one possible situation where real time flight control was required over a target area, the controller could view the low resolution image and then retroactively request specific high resolution data be sent for more detailed analysis. The ability of the drive to input, output and manipulate multiple streams of data without interruption means that even when transmitting selected information back to base, there need be no limitation on the continued collection and signal processing of new data.

SUMMARY OF THE INVENTION

The present invention provides a multiple independently positionable recording-reading head disk system which overcomes and alleviates the deficiencies of prior art systems. The disk system of the invention includes at least one disk having an arrangement of data elements. A plurality of recording-reading heads read and write data onto the disk. Each of the heads has a means for focusing onto the data. The recording-reading heads are transported over one side of the disk so as to enable each of the recording-reading heads to read and write data from and onto the disk independently of the other recording-reading heads in the system.

It is accordingly a principal object of the present invention to provide a multiple independently positionable recording-reading head disk system wherein the recording-reading heads move and act independently and either read or write data which was read or written by other heads nearly simultaneously on the same side of an optical disk.

Another object of the invention is to provide apparatus whereby in an optical disk system editing, reviewing or outputting sensor acquired data may be done substantially simultaneously without interfering with an input data stream.

It is yet another object of the present invention to provide apparatus wherein continuous and real-time storage of new data would not be interrupted by the review of any stored data on the disk.

These and other objects and advantages of the present invention will become apparent to those skilled in the art from the following detailed description of a preferred embodiment, especially when considered in conjunction with the accompanying drawings in which like numerals in several views refer to corresponding parts.

DESCRIPTION OF THE DRAWINGS

FIG. 8 is an illustrative block diagram of a system application of the invention used as a very high capacity multiported data buffer.

FIG. 9 is an illustrative block diagram of a system application of the invention as employed in a fixed quality signal compression and transmission system.

DESCRIPTION OF THE PREFERRED EMBODIMENT

Figure 1:
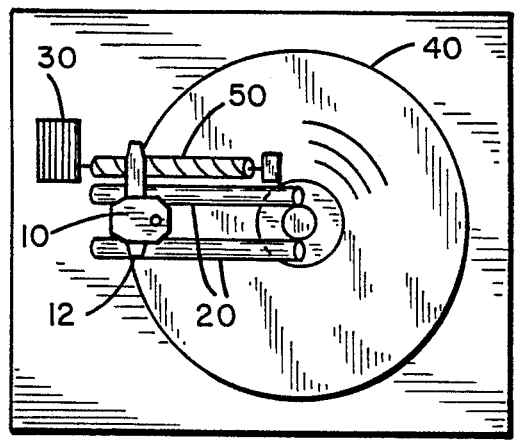
FIG. 1 is a schematic view of a typical known single head optical disk positioning system.
Figure 2:
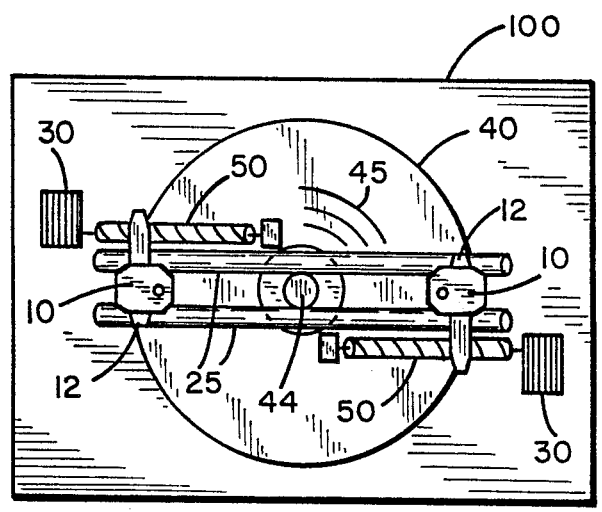
FIG. 2 is a schematic view of a dual head embodiment of the multiple independently positionable recording-reading head optical disk system of the invention.

Referring now to FIG. 2, one embodiment of the present invention incorporating dual heads in a multiple independently positionable recording-reading head optical disk system 100 is shown schematically. While a dual head system is shown in FIG. 2, a nearly unlimited number of recording-reading heads 10 could potentially be utilized. However, for the purposes of explaining the basic concepts of the device, the dual head system shown in FIG. 2 will serve as an illustrative example.

Still referring to FIG. 2, the optical disk system of the invention is shown including two recording-reading head means 10 including a means for focusing 12, optical disk 40 having an arrangement of data elements 45 and means for transporting the recording-reading heads over one side of the optical disk 40. The transporting means includes stepper motors 30, wormscrew drive 50, and extended rails 25 onto which the recording-reading heads 10 are mounted in a conventional fashion. It may be advantageous in some systems to employ a belt drive or equivalent known apparatus in place of wormscrew drive 50. The focusing means 12 may be any of several transducing means for reading and writing data onto an optical disk including a laser, prism or lens as are well known in the art and commercially available.

The disk 40 has an arrangement of data elements 45 which may be recorded in the form of minute depressions of concentric circles forming a track with a width less than one micrometer (typically 0.6 micrometers) and of a very limited depth (0.15 micrometers), the spacing between the tracks being less than two micrometers (e.g. 1.6 micrometers) and the type of disk wherein the data is arranged in a series of concentric circles forming a track. Alternatively, the data may be arranged in a continuous track forming a single track spiraling inward. In general operation, the disk 40 is rotated by a shaft 44. The data-carrying disk has a typical diameter of 5-¼ inches. The reading and recording of a track in a laser-based device, for example, is performed by means of a beam from a laser source focused onto the disk. Other focusing means are well known in the art.

Having described the basic elements of the invention, we now turn to some illustrative examples which are helpful in explaining the operation of the invention.

Figure 3:
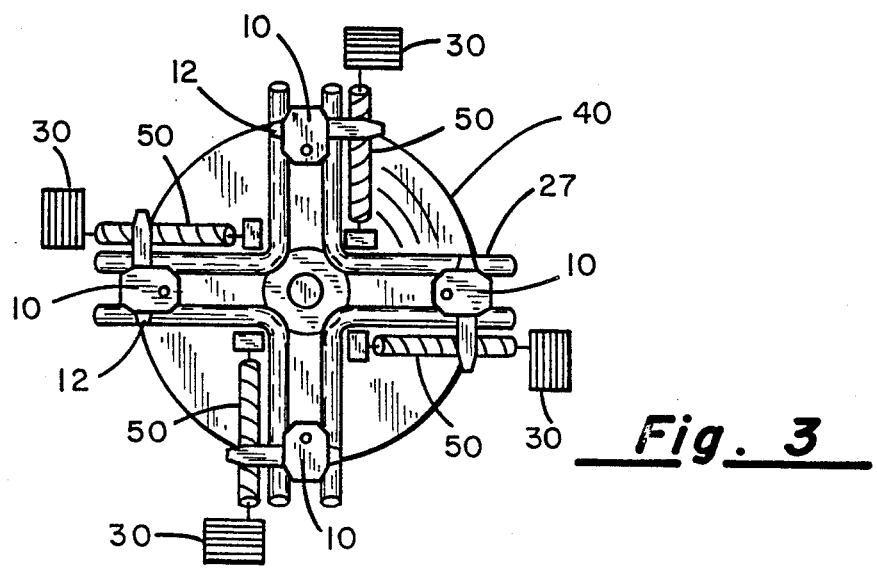
FIG. 3 is a schematic view of an illustrative example of one embodiment of the invention employing four optical recording-reading heads.

Referring now to FIG. 3, an alternative embodiment of the invention is shown employing four recording-reading heads for an optical disk system. The recording-reading heads are mounted in a manner similar to the manner as described above with respect to FIG. 2. However, instead of the extended rails as used in FIG. 2, the rails 27 of the embodiment shown in FIG. 3 are configured so as to form four radial pads for holding four recording-reading heads 10 and transporting those recording-reading heads across the top surface of the disk by means such as screw drive 50.

Figure 4:
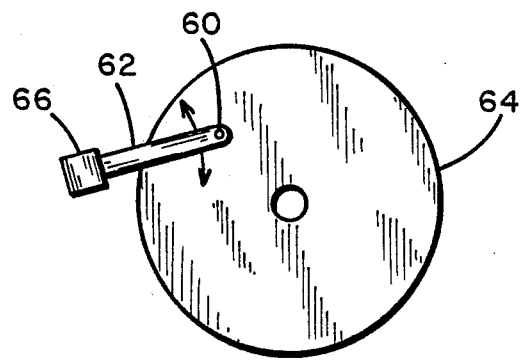
FIG. 4 is a schematic illustration of a known single head disk system employing a recording-reading head mounted on a sweep arm.
Figure 6:
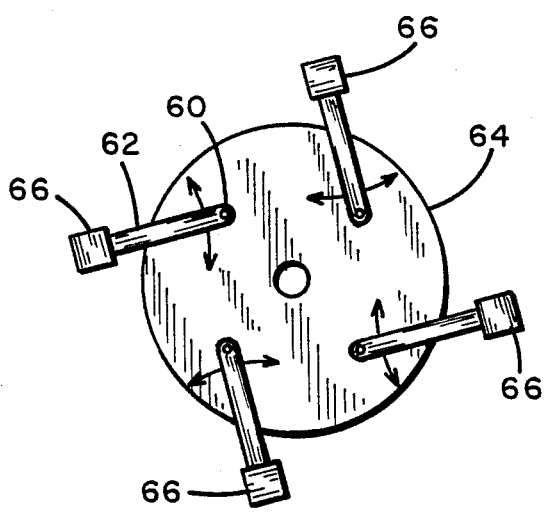
FIG. 6 is a schematic view of an alternative embodiment of the invention employing a plurality of sweep-arm-mounted recording-reading heads.

Referring now to FIG. 6, another alternative embodiment of the invention is shown employing sweep arm mechanisms 62 to transport a plurality of recording-reading heads 60 in a sweeping motion across the top of a digital disk, such as a magnetic disk. As explained above with reference to FIG. 4, the sweep arm mechanism is well known in the art, but never before has been used to implement a plurality of recording-reading heads on a single disk as is taught by the present invention.

Figure 5:
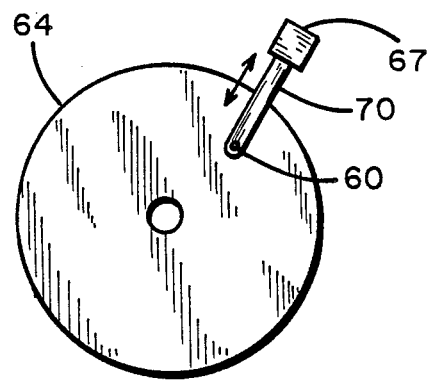
FIG. 5 is a schematic illustration of a known single head disk system employing a recording-reading head mounted in a cantilever fashion.

U.S. Pat. No. 4,371,902 to Baxter et al. discloses a two head system of the type shown in FIG. 5, however, the second head is specifically disclosed as a mechanism exclusively for reading servo positioning information from special tracks that are inbetween the tracks which store user accessible data.

This invention, in addition to disclosing n number of independent head devices and positioning mechanisms, teaches that each of these heads is to be capable of reading the same tracks, upon which is stored user accessible data. Baxter et al. does not disclose nor can it accomplish the novel capabilities as taught by this invention.

Figure 7:
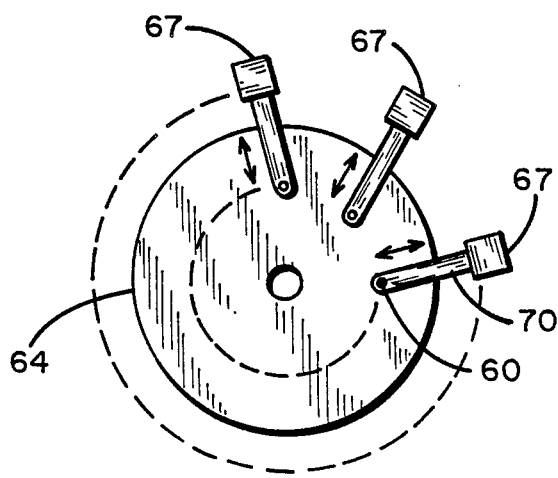
FIG. 7 is a schematic view of an alternative embodiment of the invention employing a plurality of cantilever-mounted recording-reading heads.

Similarly, FIG. 7 shows another alternative embodiment of the invention using cantilever recording heads. The cantilever mechanisms are well known in the art as is described with respect to FIG. 5.

In yet another illustrative example, a dual head system as illustrated in FIG. 2 could provide the ability to edit, review or output sensor acquired data without interfering with an input data stream. On a consumer level, a two-headed recording-reading optical video disk system would provide advantageous features over the current generation of magnetic tape video cassette recorder (VCR) equipment. For example, with the magnetic tape VCR technology, the viewing of a recorded broadcast can only begin after the broadcast has been completed and the tape is rewound. With a dual head disk system, such as is shown in FIG. 2, however, regular or even accelerated viewing could begin any time after the recorder was activated. In a home/consumer setting, a consumer might begin recording a program at 7:00 p.m. but begin viewing the program at 7:10 p.m. The disk system would thus contain ten minutes of buffered video data. As the viewer encountered parts of the recorded broadcast he did not wish to watch, he could easily "fast forward" over the segments. In the above situation, independent read and write mechanisms would suffix. Dual recording-reading heads would provide the additional capability to record and/or play two inputs simultaneously. Since the recording heads move independently and can be positioned anywhere along the tracks of the spinning disk, one of the heads could be tied to the video input from the television, for example, while the other head outputs a delayed video signal to the television screen. While the first head is receiving input information from the receiver of the television, the second head would be reading tracks previously recorded by the first head ten minutes before.

A three-headed system (as shown in FIG. 7) would provide additional features and flexibility over a simple dual head system. In one practical application, a T.V. studio or rebroadcast center equipped with a three-headed recording-reading optical disk system could continuously store network programming received by a satellite on an optical disk using one of the three heads. Using a second head, a technician could edit, enhance, delay, modify or delete parts of the recorded broadcast. One such enhancement could be the addition of captions, image processing improvements or other modifications of the video signal. The third head could then be used for output to the public, via a local broadcast or a cable. All three activities could be occurring simultaneously with only moments of delay between the receipt of the programming and its retransmission.

In yet a third example, the optical disk system of the invention could be used in connection with a building security application where output from several cameras is normally viewed sequentially on a single monitor. A multi-headed optical disk system could be employed to provide 100 percent viewing coverage of all cameras while still using only a single monitor for a group of cameras. This could be accomplished by continuously buffering all inputs to the disk system and then, as the monitor sequentially switched to the different buffered video channels, replay the image at several times normal speed. This feature could most easily be implemented on cameras monitoring areas in which little or no movement is expected. Such static scenes would not in any way appear distorted by high speed replay. If an anomaly was identified, the image could easily be replayed at normal speeds. With a multi-headed system, such as is taught by the invention, the review of any data, video or otherwise, would in no way interfere with the continuous and real-time storage of new data.

A nearly unlimited number of heads, restricted only by the physical geometry of the disk mechanism, could potentially be utilized by the present invention. However, for utilization scenarios requiring more than three concurrent input/output I/O channels, two or more separate disk systems, each with two or three heads, could in principle be linked with additional well known support electronics to accomplish nearly equivalent functionality.

FIG. 8 is an illustrative block diagram of a system application of the invention used as a very high capacity multi-ported data buffer. The system of FIG. 8 comprises input sources such as camera 90, receiver 92, and/or high band width sensors 94, which provide inputs to receiver and enhancement circuitry 105 which, in turn, provides an input to a multi-head drive of the present invention 200. The system further comprises processing apparatus 202 transmission rebroadcast apparatus 204, long term output storage apparatus 206 and long term input storage apparatus 208. Data from the drive may be transmitted for closed circuit viewing by apparatus 210 or output-to-output devices such as an earth station satellite dish 212 or, for example, cable TV 214. All of the above input sources, receiver enhancement circuitry, long term storage devices, transmission rebroadcast circuitry and output devices such as the closed circuit apparatus, the earth station and cable TV are well known in the art. Processing of data in the form of editing, captioning enhancement analysis or compression/decompression through processing means 202 is also well known in the art. What the multi-head drive of the invention 200 allows the system to do is to receive data through the receiver enhancement circuitry 105 from one of the input sources and the long term storage, to send and receive information from the processing means 202 and then output processed or real time information to any or all of the output devices. In this manner, the multi-head drive 200 serves as a very high capacity multi-ported data buffer allowing simultaneous transmission and processing of data from the same disk drive.

FIG. 9 shows another use of the multi-head drive 200 of the invention as employed in a fixed quality signal compression/transmission system. As shown in the block diagram of FIG. 9, a full bandwidth input source 220 supplies an input to the multi-head drive which has the capability of reading data into compression circuitry 222 and receiving compressed data from compression circuitry 222. Such compression circuitry is well known in the art. The multi-head drive may then, nearly simultaneously while processing input information, send out a fixed quality signal to output devices 212 or 214. The output devices, in turn, could serve as input devices to a second multi-head drive 200', which would send information to decompression circuitry 224, which is well known in the art, and receive information from decompression circuitry 224 for output to a full bandwidth output device 226. The input source 220 and the output device 226 may be any full bandwidth input or output devices as are well known in the art.

Today, most compression schemes for live video transmission allow for the degradation of the image when action in the image exceeds a certain threshold. This is because of the desire to transmit in real time and because there is no reasonable form of high-capacity buffering available. A dramatically increasing number of applications do not require strict real time capabilities, however.

An excellent example of one such application would be a TV field crew wishing to transmit "raw feed" back to the production studio for incorporation into the evening news. The cheapest method of data transmission is over an industry standard, fixed bandwidth, packet switching network. In this case typically a 384Kb type "H" channel. Unfortunately a video signal is usually composed of a random mixture of high and low activity shoots. A typical compression system is designed with an average level of activity in mind. When the activity is low, the compression system is not strained and transmission bandwidth goes underutilized. When the activity level in the image is high, the compression system cannot accommodate all the data and it must select which data to allow to overflow, thus causing a degradation in the image quality. The invention discussed herein would provide a very large capacity buffer with multi-port capability and resulting in a capability to implement complete compression without data overflow. Furthermore, the buffering of output into the fixed bandwidth transmission channel would effectively keep the utilization of the channel at 100%.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to the equipment details and operating procedures, can be accomplished without departing from the scope of the invention itself.

What is claimed is:

1. A multiple independently positionable recording-reading head optical disk system comprising:
   a rotatable optical disk having an arrangement of data elements on a data reading and recording surface of the disk;
   a plurality of recording-reading head means for reading and writing data onto the recording surface of the optical disk, each of the head means having a means for focusing; and
   a plurality of transporting means, one associated with each one of the recording-reading head-means for moving its associated head means over one side of the optical disk to selectively position the associated 3 head means relative to said recording surface, each of the transporting means being movable independently of the other transporting means to enable each of the recording-reading head means to be selectively positioned for performing data operations including reading data recorded on the recording surface and writing data onto the recording surface of the optical disk, independently of the other recording-reading head means, and further to enable the recording-reading head means to perform data operations simultaneously.

2. The system of claim 1 wherein the plurality of reading-recording heads comprises at least two recording-reading transducer heads.

3. The system of claim 2 wherein the transporting means comprises:
   (a) at least two stepper motors;
   (b) at least two extended rails wherein the rails are in a parallel relationship over the top of the disk; and
   (c) at least two wormscrew drives in parallel relationship to the extended rails wherein each of the wormscrew drives is driven by one of the stepper motors and acts in cooperation with the rails and associated stepper motor to support and transport at least one of the reading-recording heads.

4. The system as in claim 3 wherein the recording-reading heads comprise laser recording-reading transducer heads.

5. The system of claim 3 wherein the focusing means comprises a lens.

6. The system of claim 3 wherein the focusing means comprises a prism.

7. The system of claim 1 wherein the plurality of recording-reading head means comprise laser recording-reading transducer heads.

8. The system of claim 1 wherein the focusing means comprises a lens.

9. The system of claim 1 wherein the focusing means comprises a prism.

10. A multiple independently positionable recording-reading head optical disk system comprising:
    a rotatable optical disk having an arrangement of data elements on a data reading and recording surface of the disk;
    two recording-reading transducer heads for performing data operations including reading data recorded on the recording surface and writing data onto the recording surface each having a means for focusing;
    at least two stepper motors;
    at least two extended rails wherein the rails are in a parallel relationship across the disk and extend beyond the circumference of the disk; and
    at least two wormscrew drives in parallel relationship to the extended rails wherein each of the wormscrew drives is driven by one of the stepper motors and acts in cooperation with the adjacent rail and associated stepper motor to support and transport one of the recording-reading transducer heads, each of the stepper motors operable independently of the other to selectively position its associated recording-reading head for performing data operations independently of and simultaneously with any other ones of said reading-recording transducer heads.

11. The system of claim 10 wherein the focusing means is a laser.

12. The system of claim 10 wherein the focusing means is a lens.

13. The system of claim 10 wherein the focusing means is a prism.

14. The system of claim 10 wherein the optical disk data element arrangement is a single spiral.

15. The system of claim 10 wherein the optical disk data element arrangement comprises a plurality of concentric circular tracks.

16. The system of claim 1 wherein the optical disk data element arrangement comprises a spiral track.

17. The system of claim 1 wherein the optical disk data element arrangement comprises a plurality of concentric circular tracks.

18. A multiple independently positionable recording-reading head disk system comprising:
    a rotatable disk having an arrangement of data elements on a data reading and recording surface of the disk;
    a plurality of recording-reading head means for reading and writing data onto the disk; and
    means for transporting the plurality of recording-reading head means over one side of the disk so as to enable each of the recording-reading head means to read data from or write data onto the disk independently of the other recording-reading heads.

* * * * *